(12) United States Patent
Cho

(10) Patent No.: US 7,779,077 B2
(45) Date of Patent: Aug. 17, 2010

(54) FILE TRANSMISSION METHOD IN INSTANT MESSAGING SERVICE AND MOBILE COMMUNICATIONS TERMINAL FOR SUPPORTING THE SAME

(75) Inventor: Sug-Youn Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 859 days.

(21) Appl. No.: 11/260,649

(22) Filed: Oct. 26, 2005

(65) Prior Publication Data

US 2006/0095531 A1     May 4, 2006

(30) Foreign Application Priority Data

Oct. 28, 2004     (KR) ...................... 10-2004-0086836

(51) Int. Cl.
*G06F 15/16*     (2006.01)
(52) U.S. Cl. ....................................... 709/206; 709/207
(58) Field of Classification Search ................... 709/206
See application file for complete search history.

(56) References Cited

U.S. PATENT DOCUMENTS

2002/0126135 A1     9/2002     Ball et al.
2003/0078965 A1 *   4/2003     Cocotis et al. .............. 709/203
2004/0015610 A1     1/2004     Treadwell
2004/0054740 A1 *   3/2004     Daigle et al. ................. 709/206
2004/0068574 A1 *   4/2004     Costa Requena et al. .... 709/230
2005/0004968 A1 *   1/2005     Mononen et al. ............ 709/200
2007/0112915 A1 *   5/2007     Klassen et al. .............. 709/206

FOREIGN PATENT DOCUMENTS

JP        2001-184277         7/2001
WO        WO 01/13656 A1      2/2001

* cited by examiner

*Primary Examiner*—George C Neurauter, Jr.
*Assistant Examiner*—Mark D Fearer
(74) *Attorney, Agent, or Firm*—Lee, Hong, Degerman, Kang & Waimey

(57) ABSTRACT

A file transmission method in an instant messaging service by which clients can transmit files to each other during an instant messaging using a mobile communications terminal, and the mobile communications terminal for supporting the same, wherein clients can transmit and receive the file to/from each other while using an instant messaging service, using a new command related to the file transmission which is added to a protocol between a server and a client for a wireless instant messaging and using an MMS function, so that the clients can share files with each other.

9 Claims, 3 Drawing Sheets

FILE TRANSMISSION METHOD IN INSTANT MESSAGING SERVICE AND MOBILE COMMUNICATIONS TERMINAL FOR SUPPORTING THE SAME

CROSS REFERENCE TO RELATED APPLICATIONS

Pursuant to 35 U.S.C. §119(A), this application claims the benefit of earlier filing date and right of priority to Korean Application No. 86836/2004, filed on Oct. 28, 2004, the contents of which are hereby incorporated by reference herein in their entirety.

BACKGROUND OF THE INVENTION

1. Field of the Invention

The present invention relates to an instant messaging service, and particularly, to a file transmission method in an instant messaging service and a mobile communications terminal for supporting the same.

2. Description of the Background Art

Recently, various messaging services such as short messaging service (SMS), multimedia messaging service (MMS), e-mail, and the like have been provided to Internet users. Especially, instant messaging is a type of messaging service for which demand has drastically increased in recent times, and like MMS, multimedia data as well as text messages can be transmitted, and has the advantage of allowing the sending and receiving of messages in almost a real-time manner when compared with e-mail. However, such advantages have been provided only in a wired Internet environment, namely, only between Personal Computer users, and such was not appropriate in a wireless environment using a mobile communications terminal such as a mobile phone or Personal Digital Assistants (PDA), due to the following reasons.

In general, wireless instant messaging, namely, instant messaging for a mobile communications terminal, depends upon an Open Mobile Alliance (OMA) specification.

The OMA refers to a consortium established by global companies associated with wireless equipment and services in order to develop the specifications for compatible wireless services and to expand wireless services thereby. According to the OMA specification, SMS is used as a bearer for the instant messaging service.

SMS, with its single specification that was established from the beginning, a low-cost fee charging system, provision of various additional services, and the like, is already widely used over Europe and Asia, and is beginning to expand in the U.S. where initial market penetration was difficult due to problems in standardization, but is expected to become more widespread over the next few years.

However, when using the SMS as the bearer, the limited transmission capacity of the SMS may cause problems in multimedia data transmissions of large capacity. Also, for instant messaging using a data call, the instant messaging function can not be used while a voice call is in progress.

In addition, in the conventional MMS used for transmitting large capacity multimedia data, since real-time messaging cannot be ensured, instant messaging communications between mobile communications terminal users or between a mobile communications terminal user and a PC user is impossible.

Accordingly, the related art had disadvantages due to technical limitations and caused inconveniences to users because it was practically impossible to transmit files, particularly, multimedia data having a large capacity such as music files, image files, video files, etc., using a wireless instant messaging service between mobile communications terminals or between a mobile communications terminal and a PC user.

BRIEF DESCRIPTION OF THE INVENTION

Therefore, an object of the present invention is to provide a file transmission method in an instant messaging service capable of sending and receiving files between clients during an instant messaging service (i.e., during instant messaging) that uses a Short Messaging Service (SMS) as a bearer.

To achieve these and other advantages and in accordance with the purpose of the present invention, as embodied and broadly described herein, there is provided a mobile communications terminal for supporting file transmissions in an instant messaging service capable of transmitting and receiving files with at least one another mobile communications terminal during an instant messaging in the instant messaging service using an SMS as a bearer.

To achieve these and other advantages and in accordance with the purpose of the present invention, there is provided a file transmission method in an instant messaging service that is characterized with a command being added for a file transmission to a protocol between a server and a client for an instant messaging, and performing the file transmission between two or more clients using the added command.

Preferably, the command for the file transmission includes a file sending command transmitted from a transmitting side client to a server, and a file receiving command transmitted from the server to a receiving side client. The file sending command includes at least one receiving side client identifier and file location information, and the file receiving command includes a transmitting side client identifier and file location information.

To achieve these and other advantages and in accordance with the purpose of the present invention, there is provided a mobile communications terminal for supporting file transmissions in an instant messaging service comprising: a transceiver for transmitting and receiving a signal with a server; a memory unit for storing a file sending command added for a file transmission while using an instant messaging service; a display unit for displaying a screen for an instant messaging service; and a processor for processing the transmitting to a server of the file to be transmitted to at least one counterpart terminal and of the file sending command.

Preferably, when receiving a file receiving command from the server while using an instant messaging service, the processor accesses the location of the corresponding file and downloads the corresponding file via the transceiver only using a Multimedia Messaging Service (MMS) protocol in a state that an MMS client is not allowed to operate, thereafter storing the downloaded file in the memory unit.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

Explaining the present invention, if the related reference or a detailed description for a construction is recognized to make the objects of the present invention obscure, it may be omitted.

Figure 1:
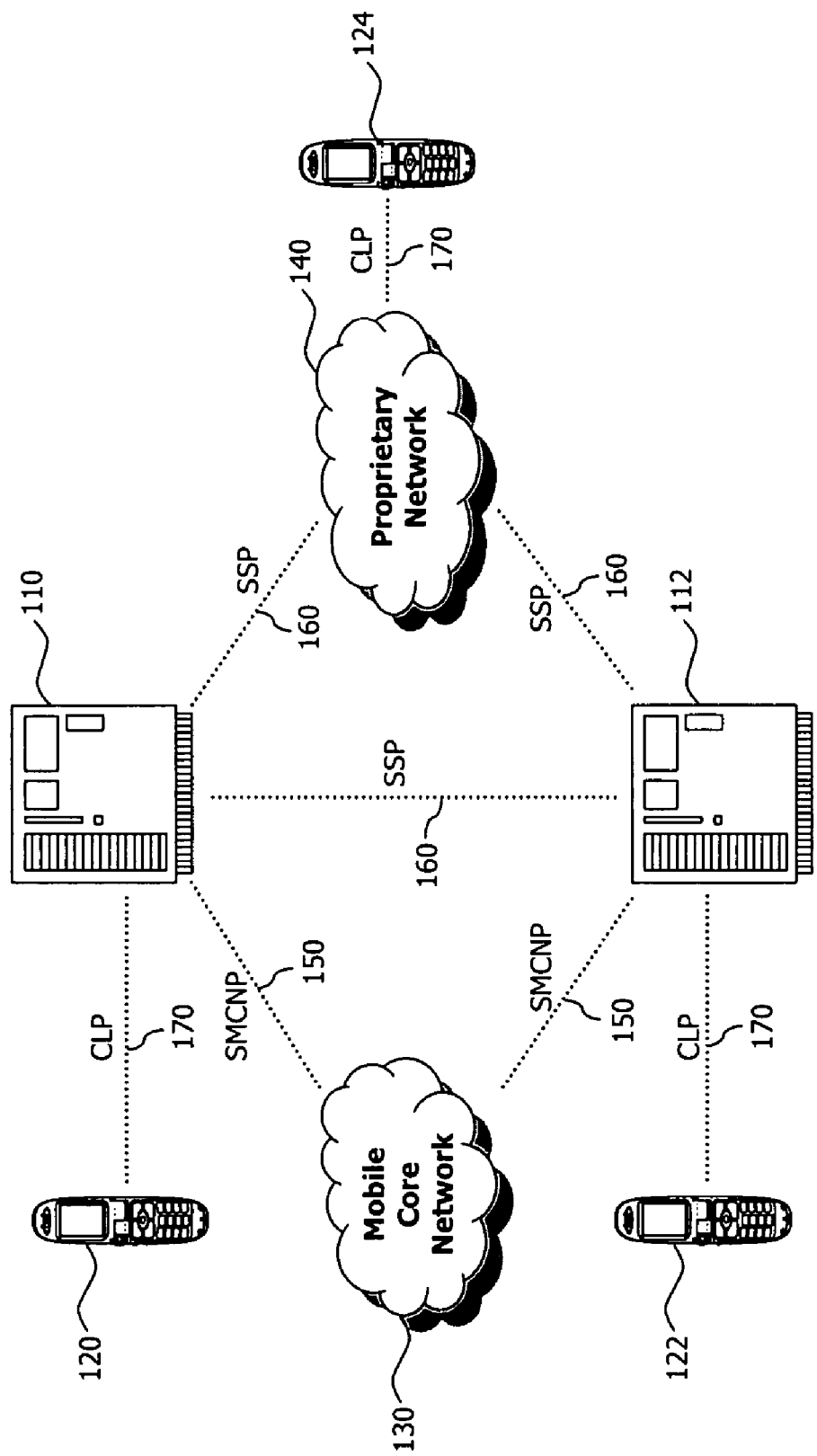
FIG. 1 illustrates an exemplary construction of an instant messaging service system for implementing the present invention.

FIG. 1 illustrates an exemplary construction of an instant messaging service system for implementing the present invention.

As illustrated in FIG. 1, the instant messaging service system is provided with servers 110 and 112 for providing an instant messaging service and a presence service, and clients 120, 122, and 124 for performing the instant messaging therebetween and the transceiving of files while using the instant messaging service (during instant messaging) through the servers 110 and 112.

The servers 110 and 112 refer to a so-called "wireless village" server, otherwise known as an Instant Messaging and Presence Service (IMPS) server or a Wireless Instant Messaging Service (WIMS) server. The clients refer to mobile communications terminals such as a mobile phone or PDA.

The presence service refers to receiving information related to a present state of the counterpart (i.e., the other party). Using the presence service, various types of information of the counterpart, namely, whether the counterpart is in a state where real-time communications is possible, the types of services that can be used, what the counterpart is doing at this moment, how the counterpart feels (emotional state), and the like, may be provided to a user.

The servers 110 and 112 are connected to a Mobile Core Network (MCN) 130 via a Server to Mobile Core Network Protocol (SMCNP) 150, and are also connected to each other through a Server to Server Protocol (SSP) 160 and connected to a proprietary network 140.

The clients 120, 122, and 124 are directly connected to the servers 110 and 112 via a Command Line Protocol (CLP) 170, or indirectly connected thereto by being linked to the proprietary network 140.

The CLP 170 is a protocol for supporting session management and presence service including the login and logout of clients, instant messaging service, group service, and the like. In the present invention, a file transmission command is added to a protocol (such as the CLP 170) between the server and the client for a wireless instant messaging, so as to enable file transmission while using the instant messaging service.

The file transmission command includes a file sending command and a file receiving command. The file sending command, which is a message (CLP message) including at least one receiving side client identifier and file location information, is transmitted from the transmitting side client to the server.

The server having received the file sending command transmits the file receiving command to at least one receiving side client. The file receiving command is composed as a message (CLP message) including a transmitting side client identifier and file location information.

For instance, the file sending command can be composed as "IMPS:To<UserId>:<File Location URL>" to thereby allow the server to transmit the file location URL (Uniform Resource Locator) to the UserId (the receiving side client identifier). The server having received the file sending command transmits the file receiving command to the receiving side client. The file receiving command can be composed as "IMPS:From<UserId>:<File Location URL>" to thereby allow the receiving side client to download the file transmitted by the UserId (the transmitting side client identifier) with reference to the file location URL.

Figure 2:
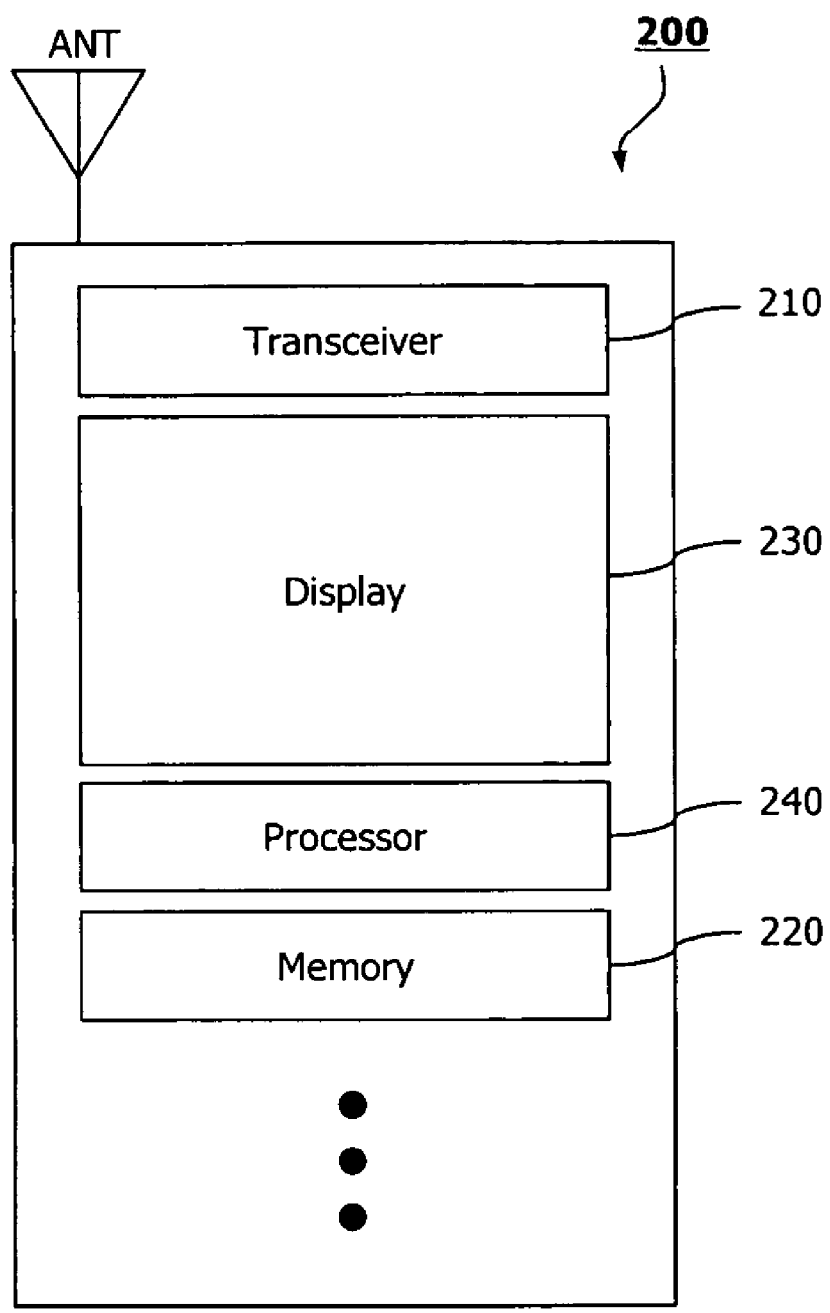
FIG. 2 illustrates an exemplary construction of a mobile communications terminal for supporting file transmissions in an instant messaging service according to an embodiment of the present invention.

FIG. 2 illustrates an exemplary construction of the client, namely, a mobile communications terminal for supporting file transmissions in an instant messaging service according to an embodiment of the present invention.

Referring to FIG. 2, the mobile communications terminal 200 for supporting file transmissions in an instant messaging service includes: a transceiver 210 for transmitting and receiving a signal with a server; a memory unit 220 for storing a file transmission command added for the file transmission while using the instant messaging service; a display unit 230 for displaying a screen for an instant messaging service; and a processor 240 for processing the transmitting to the server of a file to be transmitted to at least one counterpart terminal and the file transmission command.

The processor 240 accesses the location of the corresponding file when receiving a file receiving command from the server while using the instant messaging service, and downloads the file via the transceiver 210 only using an MMS protocol in a sate that an MMS client is not allowed to operate, thereafter storing the downloaded file in the memory unit 220.

As aforementioned, the file sending command can be composed by including the receiving side client identifier and the file location information such as "IMPS:To<UserId>:<File Location URL>" and the file receiving command can be composed by including the transmitting side client identifier and the file location information such as "IMPS:From<UserId>:<File Location URL>".

Figure 3:
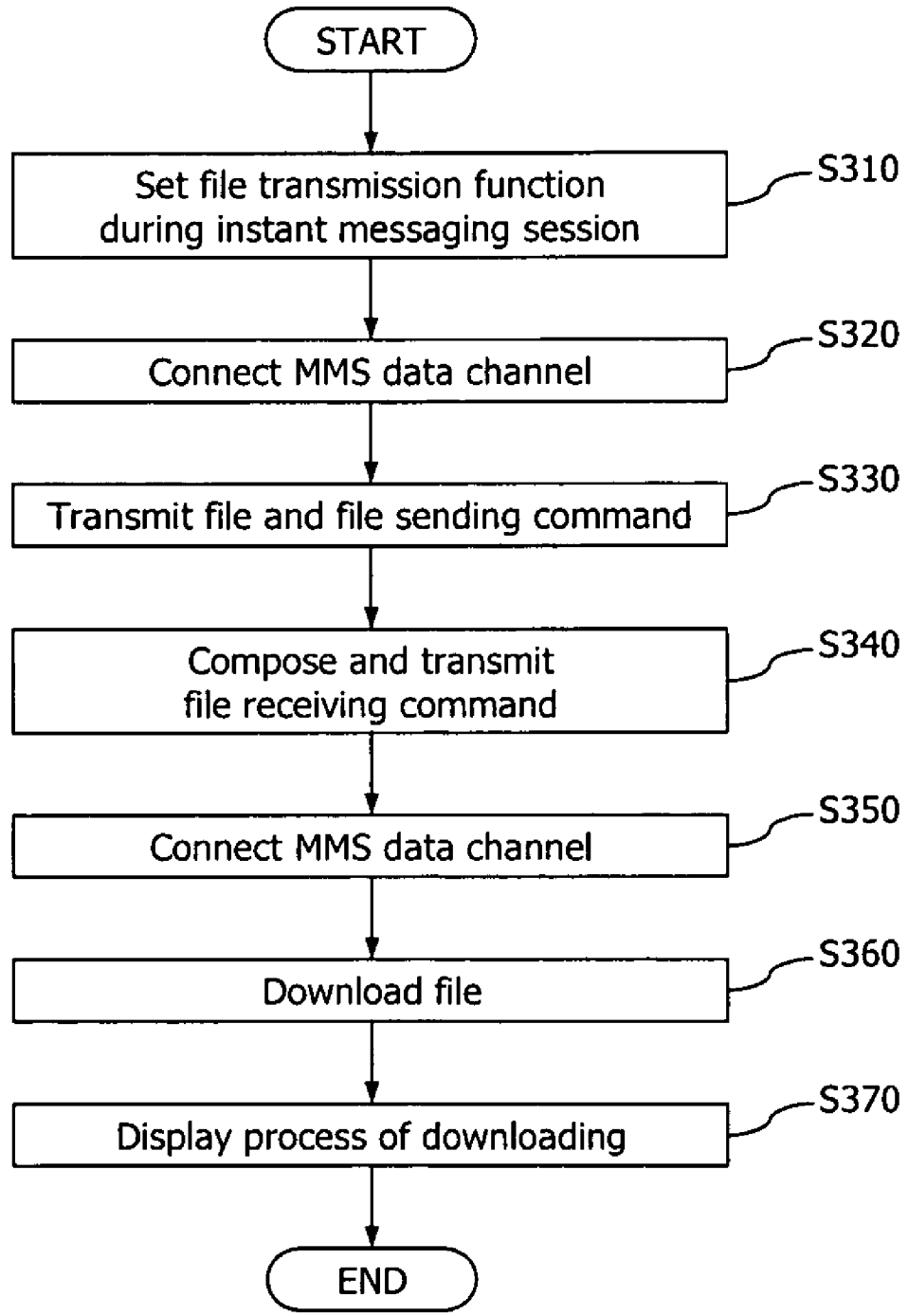
FIG. 3 is a flowchart illustrating sequential steps of an exemplary file transmission method in an instant messaging service according to an embodiment of the present invention.

FIG. 3 is a flowchart illustrating sequential steps of an exemplary file transmission method in an instant messaging service according to an embodiment of the present invention.

With reference to FIG. 3, when a user sets a file transmission function in the transmitting side client (i.e., a mobile communications terminal) while using the instant messaging service (S310), a data channel of a multimedia messaging service is established with the server (S320). When a file (i.e., a multimedia file) is transmitted to the server upon setting by the user after the data channel is completely established with the server, the file transmission command is also transmitted to the server (S330).

The file transmission command can include an identifier for identifying the receiving side client and the file location information such as "IMPS:To<UserId>:<File Location URL>" and is transmitted via the CLP.

When the server receives the file sending command, the server composes the file receiving command according to the file sending command so as to transmit the file receiving command to the receiving side client (S340).

The file receiving command can include an identifier for identifying the transmitting side client which has transmitted the file and the file location information such as "IMPS:

From<UserId>:<File Location URL>" and is also transmitted to the receiving side client via the CLP.

When the receiving side client receives the file receiving command, a data channel of a multimedia messaging service is established with the server (S350). Then, the receiving side client downloads the file from the file location by only using the MMS protocol (S360). Also, the receiving side client may display on the display unit 240, information such as, the progress of the downloading for the file which is being downloaded, downloading completion, storing the downloaded file, and the like (S370).

As described above, using the file transmission method in the instant messaging service and the mobile communications terminal for supporting the same according to the present invention, in the wireless instant messaging service using the mobile communications terminal, a new command related to the file transmission is added to the protocol between the server and the client for the wireless instant messaging, and the added command and an MMS function are used to transmit and receive data files between clients (i.e., mobile communications terminals), whereby the user and its counterpart can effectively transmit and receive the file and share it while using the instant messaging service even in a radio (wireless) environment.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A file transmission method in an instant messaging service of a mobile terminal, the method comprising:
   adding a command for file transmission to a protocol between a server and a client for instant messaging, the command comprising a file sending command and a file receiving command; and
   performing the file transmission between two or more clients using the added command,
   wherein a file transmitted from a transmitting side client is downloaded by a receiving side client having received the file receiving command during the instant messaging,
   wherein the file sending command is sent from the transmitting side client to the server and the file receiving command is sent from the server to the receiving side client during the instant messaging,
   wherein the file sending command comprises at least one receiving side client identifier and file location information, and the file receiving command comprises a transmitting side client identifier and file location information, and
   wherein the protocol comprises a Command Line Protocol (CLP).

2. A file transmission method in an instant messaging service of a mobile terminal, the method comprising:
   adding a command for file transmission to a protocol between a server and a client for instant messaging, the command comprising a file sending command and a file receiving command; and
   performing the file transmission between two or more clients using the added command,
   wherein a file transmitted from a transmitting side client is downloaded by a receiving side client having received the file receiving command during the instant messaging,
   wherein the file sending command is sent from the transmitting side client to the server and the file receiving command is sent from the server to the receiving side client during the instant messaging,
   wherein the file sending command comprises at least one receiving side client identifier and file location information, and the file receiving command comprises a transmitting side client identifier and file location information, and
   wherein the server comprises a Wireless Village (WV) or an Instant Messaging and Presence Service (IMPS) server or a Wireless Instant Messaging Service (WIMS) server.

3. The method of claim 1, wherein the client comprises a mobile communications terminal.

4. A file transmission method in an instant messaging service of a mobile terminal, the method comprising:
   adding a command for file transmission to a protocol between a server and a client for instant messaging, the command comprising a file sending command and a file receiving command; and
   performing the file transmission between two or more clients using the added command,
   wherein a file transmitted from a transmitting side client is downloaded by a receiving side client having received the file receiving command during the instant messaging,
   wherein the file sending command is sent from the transmitting side client to the server and the file receiving command is sent from the server to the receiving side client during the instant messaging,
   wherein the file sending command comprises at least one receiving side client identifier and file location information, and the file receiving command comprises a transmitting side client identifier and file location information, and
   wherein the command for the file transmission is a CLP message to be transferred to the server and at least one other client.

5. The method of claim 1, wherein the transmitting side client transmits the file to the server using a Multimedia Messaging Service (MMS) function when a user sets the file transmission.

6. The method of claim 1, wherein the receiving side client having received the file receiving command during the instant messaging downloads the file by accessing a location of the file by only using an MMS protocol without operating an MMS client.

7. A file transmission method in an instant messaging service of a mobile terminal, the method comprising:
   transmitting a file and a file sending command from a transmitting side client to a server while using an instant messaging service;
   composing a file receiving command, by the server having received the file sending command, and thereafter transmitting the file receiving command to at least one receiving side client; and
   analyzing the file receiving command and downloading the file by the at least one receiving side client having received the file receiving command,
   wherein the file sending command comprises at least one receiving side client identifier and file location information, and the file receiving command comprises a transmitting side client identifier and file location information, and wherein the file sending command and the file receiving command are Command Line Protocol (CLP) messages.

8. The method of claim 7, wherein the transmitting side client transmits the file to the server using an MMS function when a user sets a file transmission.

9. The method of claim 7, wherein when the at least one receiving side client receives the file receiving command, the at least one receiving side client accesses a location of a corresponding file and downloads the corresponding file only using an MMS protocol in a state that an MMS client is not allowed to operate.

* * * * *